United States Patent
Colley et al.

(10) Patent No.: US 10,443,432 B2
(45) Date of Patent: Oct. 15, 2019

(54) METHOD FOR MANAGING A GAS TURBINE ASSEMBLY AT LOW SPEED AND CORRESPONDING GAS TURBINE ASSEMBLY

(71) Applicant: Siemens Aktiengesellschaft, Munich (DE)

(72) Inventors: Stephen Colley, Lincoln (GB); Michael Smith, North Hykeham (GB)

(73) Assignee: Siemens Aktiengesellschaft, Munich (DE)

( * ) Notice: Subject to any disclaimer, the term of this patent is extended or adjusted under 35 U.S.C. 154(b) by 371 days.

(21) Appl. No.: 15/311,944

(22) PCT Filed: May 22, 2015

(86) PCT No.: PCT/EP2015/061459
§ 371 (c)(1),
(2) Date: Nov. 17, 2016

(87) PCT Pub. No.: WO2015/185384
PCT Pub. Date: Dec. 10, 2015

(65) Prior Publication Data
US 2017/0122125 A1 May 4, 2017

(30) Foreign Application Priority Data
Jun. 6, 2014 (EP) ................................ 14171494

(51) Int. Cl.
*F01D 11/00* (2006.01)
*F01D 21/00* (2006.01)
(Continued)

(52) U.S. Cl.
CPC ............ *F01D 21/003* (2013.01); *F01D 11/04* (2013.01); *F01D 15/10* (2013.01); *F01D 25/36* (2013.01);
(Continued)

(58) Field of Classification Search
CPC .......... F01D 15/08; F01D 25/36; F01D 11/02; F02C 3/10; F05D 2240/55; F05D 2270/22; F05D 2270/23; F05D 2270/304
See application file for complete search history.

(56) References Cited

U.S. PATENT DOCUMENTS 4,195,231 A * 3/1980 Reed ..................... F01K 23/105
290/40 R
5,141,389 A * 8/1992 Bear ......................... F01D 3/00
277/348
(Continued)

FOREIGN PATENT DOCUMENTS

JP 2938856 B1 8/1999
RU 2371595 C1 10/2009
(Continued)

OTHER PUBLICATIONS

RU office action dated Nov. 7, 2017, for RU patent application No. 2016147357.
(Continued)

*Primary Examiner* — Ninh H. Nguyen
(74) *Attorney, Agent, or Firm* — Beusse Wolter Sanks & Maire

(57) ABSTRACT

A method manages a gas turbine assembly during start up or shut down, the gas turbine assembly including a twin shaft gas turbine having an input shaft and an output shaft and a speed sensor for measuring a speed of the output shaft, the gas turbine assembly further having a rotor mounted on said output shaft and provided with at least a dry gas seal for preventing leakage of a process gas. The method includes monitoring the speed of the output shaft, and in parallel, reducing or increasing the speed of the input shaft after the monitored speed of the output shaft has remained above zero and below a predefined slow roll speed limit for a predefined acceptable time.

20 Claims, 5 Drawing Sheets

(51) Int. Cl.
*F01D 11/04* (2006.01)
*F01D 15/10* (2006.01)
*F01D 25/36* (2006.01)
*F02C 3/10* (2006.01)

(52) U.S. Cl.
CPC ............ *F02C 3/10* (2013.01); *F05D 2220/32* (2013.01); *F05D 2270/023* (2013.01); *F05D 2270/304* (2013.01)

(56) References Cited

U.S. PATENT DOCUMENTS

| | | | |
|---|---|---|---|
| 6,854,274 B2 * | 2/2005 | Keller | F02C 7/057 60/39.281 |
| 9,145,783 B2 * | 9/2015 | Delrahim | F01D 11/06 |
| 9,951,637 B2 * | 4/2018 | Berti | F01D 11/001 |
| 2007/0137219 A1 | 6/2007 | Hugues et al. | |
| 2007/0173365 A1 | 7/2007 | Hugues et al. | |

FOREIGN PATENT DOCUMENTS

| | | |
|---|---|---|
| RU | 2407902 C2 | 12/2010 |
| RU | 2407903 C2 | 12/2010 |
| WO | 8503550 A1 | 8/1985 |

OTHER PUBLICATIONS

EP Search Report dated Dec. 15, 2014, for EP application No. 14171494.9.
International Search Report dated Sep. 4, 2015, for PCT application No. PCT/EP2015/061459.

* cited by examiner

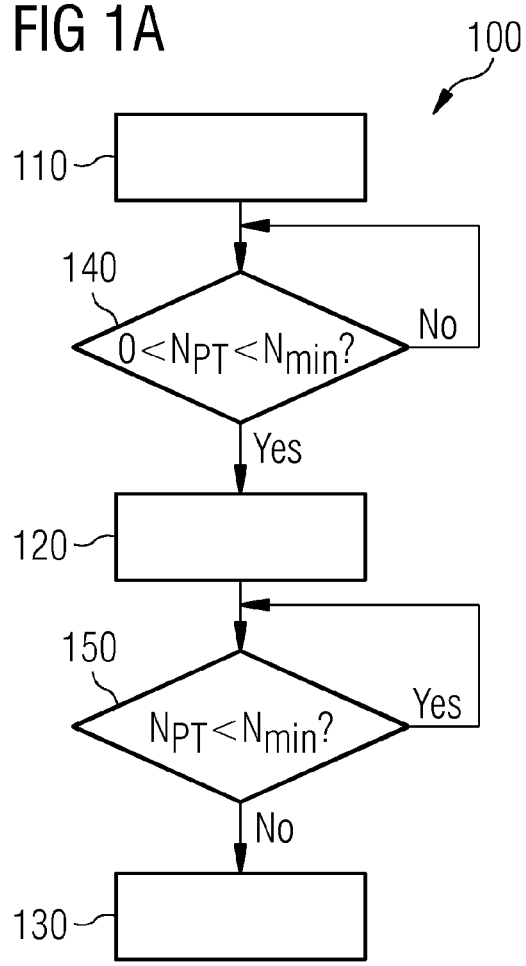

METHOD FOR MANAGING A GAS TURBINE ASSEMBLY AT LOW SPEED AND CORRESPONDING GAS TURBINE ASSEMBLY

CROSS REFERENCE TO RELATED APPLICATIONS

This application is the US National Stage of International Application No. PCT/EP2015/061459 filed May 22, 2015, and claims the benefit thereof. The International Application claims the benefit of European Application No. EP14171494 filed Jun. 6, 2014. All of the applications are incorporated by reference herein in their entirety.

FIELD OF INVENTION

The present invention relates to a method for managing a gas turbine assembly at low speed. More particularly the present invention relates to a method for managing a gas turbine assembly during start up or shut down.

ART BACKGROUND

A gas compressor may be driven by a ground base gas turbine having a single or twin shaft arrangement. In a single shaft arrangement the gas turbine include at least an inlet compressor and a power turbine mounted on the same shaft, on which also the gas compressor is mounted.

In a twin shaft arrangement the gas turbine comprises a so called 'gas generator' including a first shaft and a power turbine mounted on a second shaft. The gas compressor is also mounted on the second shaft. A gas generator typically comprises an inlet compressor, a compressor turbine, both mounted on the first shaft, and a combustor between the inlet compressor and the compressor turbine. A gas generator can also consist of more than one pair of compressor and compressor turbine. The gas generator is used for delivering gas at certain conditions of pressure and temperature to the power turbine, by means of a connection between the outlet of the compressor turbine and the inlet of the power turbine.

Gas compressors driven by ground based gas turbines, either with single or twin shaft arrangement, typically use so called 'dry gas seals' on their rotors to prevent leakage of the gas being pumped. Typically a dry gas seal comprises a stationary ring and a rotary ring having a planar annular surface which faces the stationary ring and which is provided with grooves. A gas is normally present in the very fine clearances between the stationary ring and the surface of the rotary ring provided with grooves. In operation, when the rotary ring rotates with respect to the stationary ring, the viscosity of the gas flowing in the grooves maintains a thin cushion between the rings, thus preventing wear. The main drawback of dry gas seals is that, below a minimum speed, for example in a 5-15MW compressor system such minimum speed being typically below 400 rpm, a suitable gas cushion does not form and contact occurs. Therefore, it should be desirable to prevent the compressor spinning below the minimum speed. Spinning below the minimum speed required by the seals to work properly is normally referred to as 'slow roll'.

It is nevertheless also necessary that gas turbines are spun by the starter system, post shutdown, at a low speed to cool the engine and to prevent distortion due to temperature gradients in the rotors, which can cause vibration problems and interferences at the subsequent re-start. Failure to spin the rotor soon after shutdown, the time is dependent on the size of the gas turbine, typically within minutes for a small gas turbine e g 15 minutes, can cause appreciable delays to restarting the engine (such delay being normally referred to as 'lockout') or can risk damage to compressor blades and seals.

For single shaft gas turbines the gas turbine rotor and the gas compressor is typically mechanically connected, e.g. via a clutch and so can be made to rotate together driven by the starter system, while on twin shaft gas turbines, the starter system directly drives the inlet compressor of the gas generator. The spinning of the gas generator can provide sufficient flow to cause the power turbine and hence the gas compressor to slow roll under some or all circumstances, depending on the driven unit and installation details, as well as variations in weather conditions. Therefore, avoiding slow roll on twin shaft gas turbines can be particularly demanding.

SUMMARY OF THE INVENTION

It may be an object of the present invention to provide a method for optimally limiting the time interval during which a twin shaft gas turbine assembly including dry gas seals spins at speeds in the range of slow roll. It may be a further object of the present invention to provide a method for managing a twin shaft gas turbine assembly at low speed which, as the causes of variation in response are varied, continually monitors for slow roll, and takes action to limit it when it is detected.

In a gas turbine assembly comprising dry gas seals, by 'low speed' it is meant a speed below slow roll limit speed, which typically occurs during start up or shut down. By 'slow roll limit speed' it is meant the minimum speed required by the dry gas seals to work properly, i.e. to avoid contact and wear between rotary and stationary elements of the seals.

In order to achieve the objects defined above, a method for managing a gas turbine assembly at low speed and a gas turbine assembly according to the independent claim is provided. The dependent claims describe advantageous developments and modifications of the invention.

According to a first aspect of the present invention, a method for managing a gas turbine assembly during start up or shut down, the gas turbine assembly including a twin shaft gas turbine comprising an input and an output shaft and a speed sensor for measuring the speed of the output shaft, the gas turbine assembly further comprising a rotor mounted on said output shaft and provided with at least a dry gas seal for preventing leakage of a gas between the rotor and the dry gas seal, the method comprising monitoring the speed of the output shaft and reducing or increasing the speed of the input shaft after the speed of the output shaft has remained above zero and below a predefined slow roll speed limit for a predefined acceptable time.

By 'predefined acceptable time' it is meant an interval of time for which slow roll is accepted, either because the seal wear which will be caused is below acceptable limits or for other operative reasons. In embodiments of the present invention, such interval may be null.

According to exemplary embodiments of the present invention, the predefined slow roll speed limit is between approximately 200 and approximately 600 rpm.

According to a further exemplary embodiment of the present invention, the method of the present invention manages a twin shaft gas turbine during start up and it comprises monitoring the speed of the output shaft and in sequence:—start spinning the input shaft,—if after a first predefined acceptable time the speed of the output shaft is above zero but remains below the predefined slow roll speed limit, then increasing the speed of the input shaft,—if the speed of the output shaft remains below the predefined slow roll speed limit, then waiting for a second predefined acceptable time before further increasing the speed of the input shaft.

During start up, as the speed of the output shaft starts from zero, slow roll cannot be avoided completely. Advantageously, when a speed below the slow roll speed limit is detected after a first predefined acceptable time, the method first tries to bring the spin of the output shaft above the slow roll speed limit, increasing the speed of the input shaft. If the speed of the output, for reasons deriving from the structure or the functioning of the gas turbine, remains below such limit, the slow roll speed is allowed to continue for a second acceptable time, which in gas turbines is typically coincident with the purge time. By 'purge time' it is meant the time during which the gas turbine is kept spinning by the starter system without igniting the combustor, in order to make any combustible gas to flow towards the exhaust. The duration of the purge time depends on the installation, i.e. mainly on the size of the inner volumes of the gas turbine assembly together with its ducting and any waste heat recovery systems.

According to exemplary embodiments of the present invention, the first predefined acceptable time is between 10 s and 30 s.

According to exemplary embodiments of the present invention, the second predefined acceptable time is between 60 s and 300 s. The second predefined acceptable is typically coincident with the purge time, i.e. with a time that, at low speed, is sufficient to displace 3 to 5 times the inner overall volume of the gas turbine assembly.

According to a further exemplary embodiment of the present invention, the method of the present invention manages a twin shaft gas turbine during shut down and comprises monitoring the speed of the output shaft and in sequence:—waiting until the output shaft has stopped,—waiting for a predefined wait time,—spinning the input shaft at a first predefined speed,—if the speed of the output shaft remains for a third predefined acceptable time above zero but below the predefined slow roll speed limit, then increasing the speed of the input shaft up to a second predefined speed greater than the first predefined speed,—if the speed of the output shaft remains below the predefined slow roll speed limit, then stopping the input shaft, then—waiting for a time equal to the wait time, then—spinning the input shaft at a third predefined speed lower than the first predefined speed,—if the speed of the output shaft is greater than zero, then stopping the input shaft, then—waiting for a time equal to the wait time, then—periodically spinning the input shaft up to a fourth predefined speed lower than the third predefined speed and stopping the input shaft for an interval time,—if the speed of the output shaft is greater than zero, then stopping the input shaft, and—preventing the gas turbine assembly to be restarted during a resting time.

According to exemplary embodiments of the present invention, the third predefined acceptable time is between 10 s and 30 s.

Advantageously, after shutdown the following input shaft spin conditions are tried in succession in order to achieve the primary objectives of cooling the engine and preventing distortion due to temperature gradients in the rotors: a) spinning the input shaft at a first or second predefined speed in order to make the output shaft spin at a speed higher than the slow roll limit; b) spinning the input shaft at third predefined speed, lower than the first predefined speed, in order to maintain the output shaft still; c) spinning the input shaft in short bursts at fourth predefined speed, lower than the third predefined speed, in order to maintain the output shaft still.

These strategies a)-c) are tried in a sequence from the most beneficial one for the gas turbine assembly to the least beneficial one, and only if none of them succeed in preventing unacceptable rotation of the driven gas compressor the control system abandons the spin and accept consequential delays to the restart of the gas turbine.

According to exemplary embodiments of the present invention, the first predefined speed is 10 to 20 percent of the nominal power turbine speed. For example, being the nominal power turbine speed 10000 rpm, the first predefined speed is 1000 to 2000 rpm.

According to exemplary embodiments of the present invention, the second predefined speed is rpm 20 to 40 percent of the nominal power turbine speed. For example, being the nominal power turbine speed 10000 rpm, the second predefined speed is 2000 to 4000 rpm.

According to exemplary embodiments of the present invention, the third predefined speed is 5 to 10 percent of the nominal power turbine speed. For example, being the nominal power turbine speed 10000 rpm, the third predefined speed is 500 to 1000 rpm.

According to exemplary embodiments of the present invention, the fourth predefined speed is less than 1 percent of the nominal power turbine speed (for example 50 to 100 rpm if the nominal power turbine speed is 10000 rpm) and the interval time between two subsequent burst at the fourth predefined speed is 2 to 3 min.

According to exemplary embodiments of the present invention, the wait time before applying each of the three strategies defined above is 2 to 3 min.

According to exemplary embodiments of the present invention, the resting time is 10 min to 4 hours. If the method is unsuccessful in preventing the output shaft from spinning below the slow roll limit, then the gas turbine is prevented from restarting for an extended period (4 hours), if not restarted within a shorter interval (10 minutes).

According to exemplary embodiments of the present invention, the gas turbine assembly comprises a gas compressor including the rotor and the dry gas seal to be protected from wear by the present method.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

FIG. 1a shows a block diagram illustrating a method for managing a gas turbine assembly during start up according to the present invention.

DETAILED DESCRIPTION

Figure 1B:
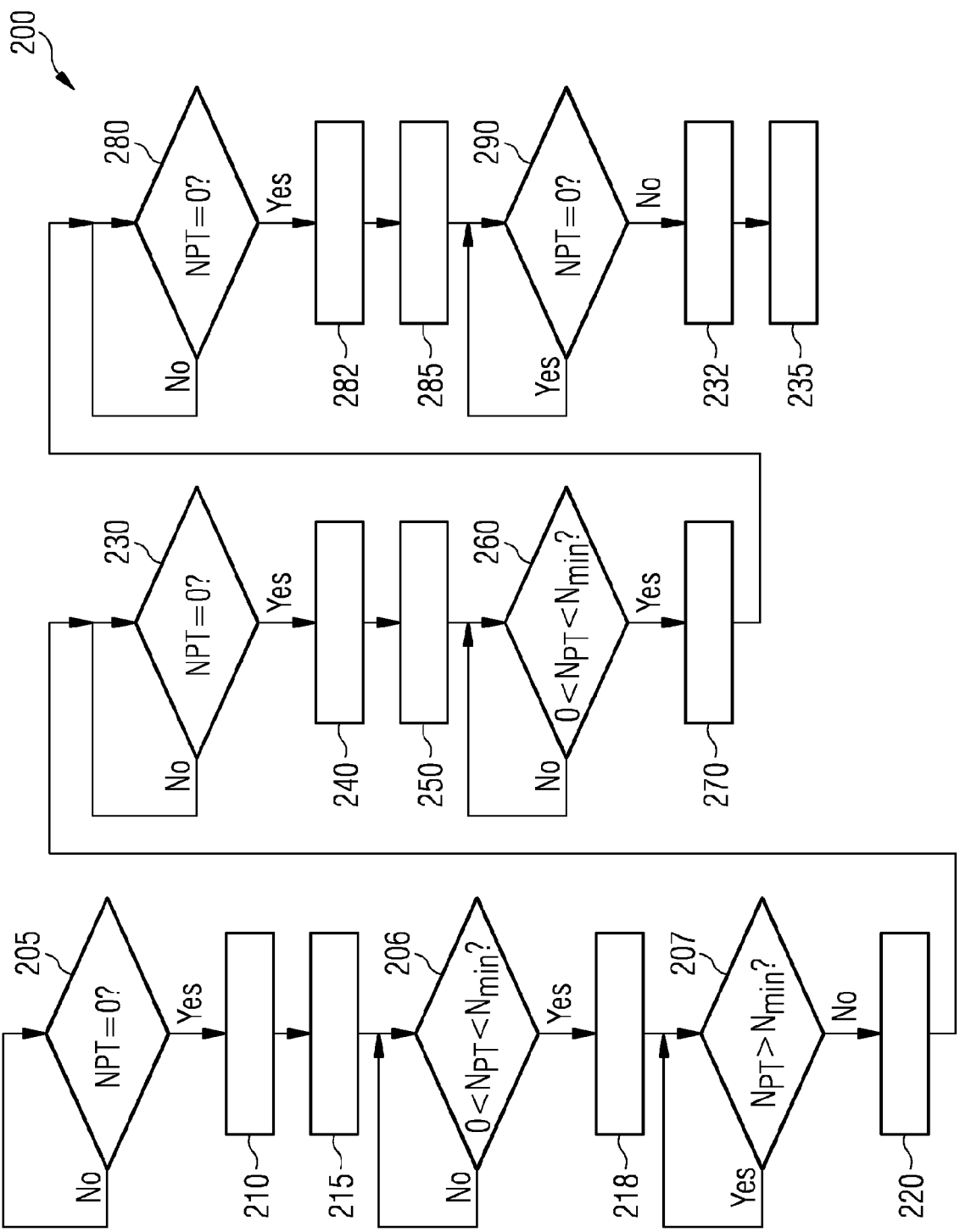
FIG. 1b shows a block diagram illustrating a method for managing a gas turbine assembly during shut down according to the present invention.

FIGS. 1a and 1b show a method 100, 200 according to the present invention for managing a gas turbine assembly 10 during start up or shut down. The gas turbine assembly 10 is described in more detail further below.

The method 100, 200 comprises:—monitoring the speed of an output shaft 21 of the gas turbine assembly 10, and in parallel—reducing or increasing the speed of an input shaft 13 of the gas turbine assembly 10, after the monitored speed of the output shaft 21 has remained above zero and below a predefined slow roll speed limit $n_L$ for a predefined acceptable time T1, T2, T3.

Figure 2:
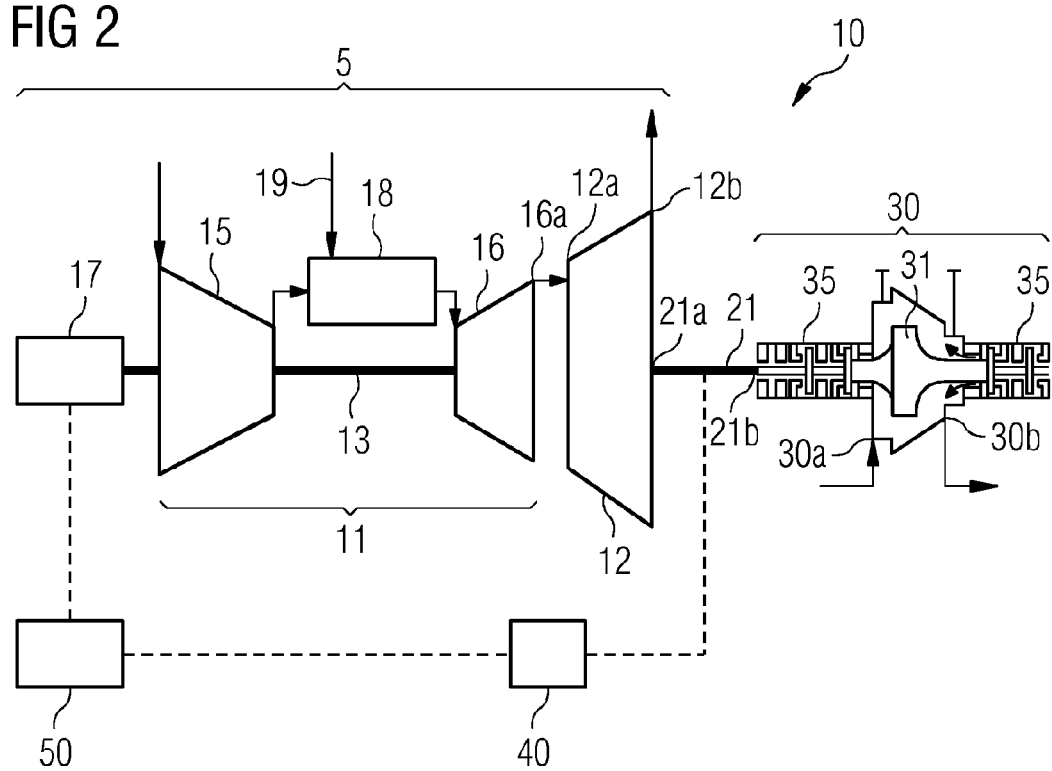
FIG. 2 shows a schematical view of a twin shaft gas turbines to which the method of the present invention is applicable.

FIG. 2 schematically shows the twin shaft gas turbine assembly 10 which can be managed at low speed, i.e. at start up and shut down, by the method 100, 200 according to the present invention. The gas turbine assembly 10 includes a gas turbine 5 and a gas compressor 30, mechanically connected to each other, by means of an outlet shaft 21. The gas compressor 30 is powered by the gas turbine 5 to compress a process gas flowing from a inlet 30a to an outlet 30b of the gas compressor 30.

The gas turbine 5 comprises a gas generator 11 and a power turbine 12. Power turbine 12 has a nominal speed of 10000 rpm. According to other possible embodiments, a power turbine with a different nominal turbine speed may be used.

The gas generator 11 comprises an inlet compressor 15, a compressor turbine 16 and an inlet shaft 13, on which the inlet compressor 15 and the compressor turbine 16 are mounted. The gas turbine 5 further comprises a variable speed electrical motor 17, which is connected to the inlet shaft 13, at an axial end proximal to the inlet compressor 15. The electrical motor 17 is operated as a starter system for the gas generator 11.

In the gas generator 11, a combustor 18 is provided between the inlet compressor 15 and the compressor turbine 16. In the combustor 18 a fuel 19 is injected burnt with the aid of the compressed air, working as a combustive, coming from the inlet compressor 15. After the burning process, a hot gas comprising combustion products exits the combustor 18 and enters the compressor turbine 16 where the gas is expanded. From an outlet 16a of the compressor turbine 16 the expanded gas is delivered to an inlet 12a of the power turbine 12, which is mounted on a first axial end 21a of an output shaft 21. In the power turbine 12 the gas is further expanded in order to generate a mechanical power output which is transferred to the gas compressor 30 mounted on a second axial end 21b of the output shaft 21. After the expansion in the power turbine 12, the gas is released to the atmosphere through an exhaust outlet 12b. The gas turbine 5 further comprises a speed sensor 40 for monitoring the speed of the output shaft 21. The value of the rotary speed of the output shaft 21, measured by sensor 40, is received by a controller 50, which controls the electrical motor 17, as better explained further below with reference to FIGS. 1a, 1b and 4 to 7.

Gas compressors 30 comprises one or more rotors 31 which are mechanically linked to the outlet shaft 21 and a plurality of dry gas seals 35 between the rotor(s) 31 and the output shaft 21 to prevent leakage of the process gas.

Figure 3:
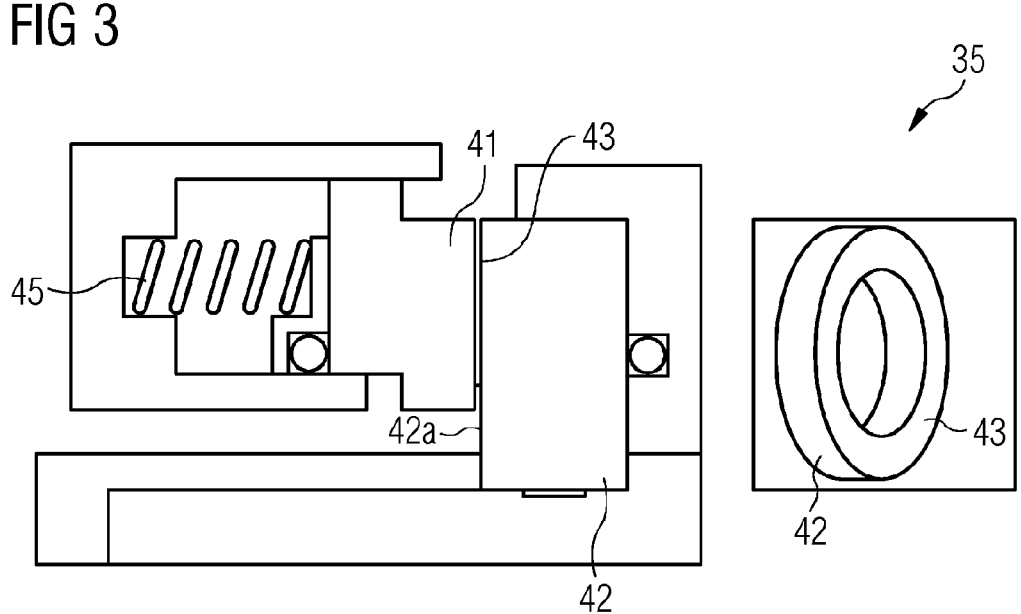
FIG. 3 shows a schematical view of one component of FIG. 2, FIGS. 4 to 7 show four exemplary graphic plots of gas turbine variables that can be controlled by the method of the present invention.
Figure 4:
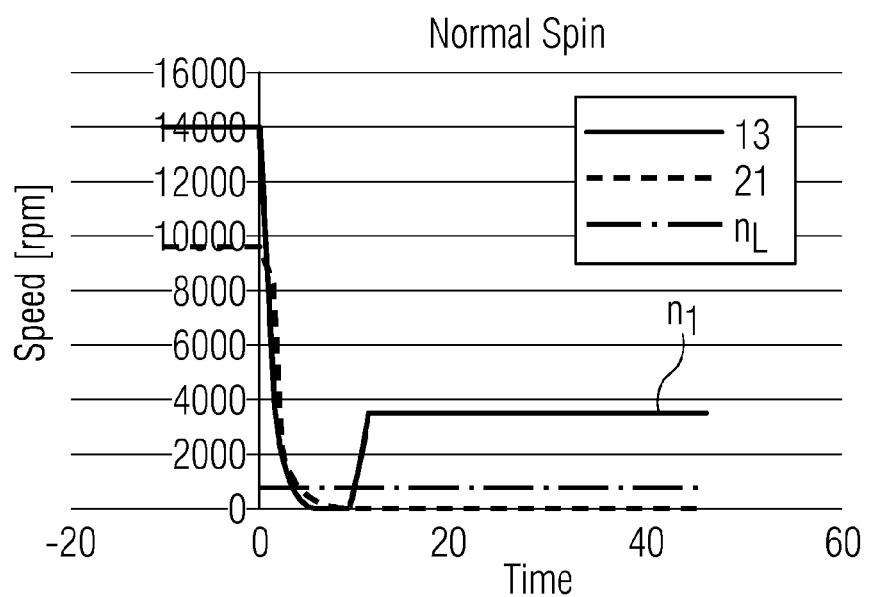
Figure 5:
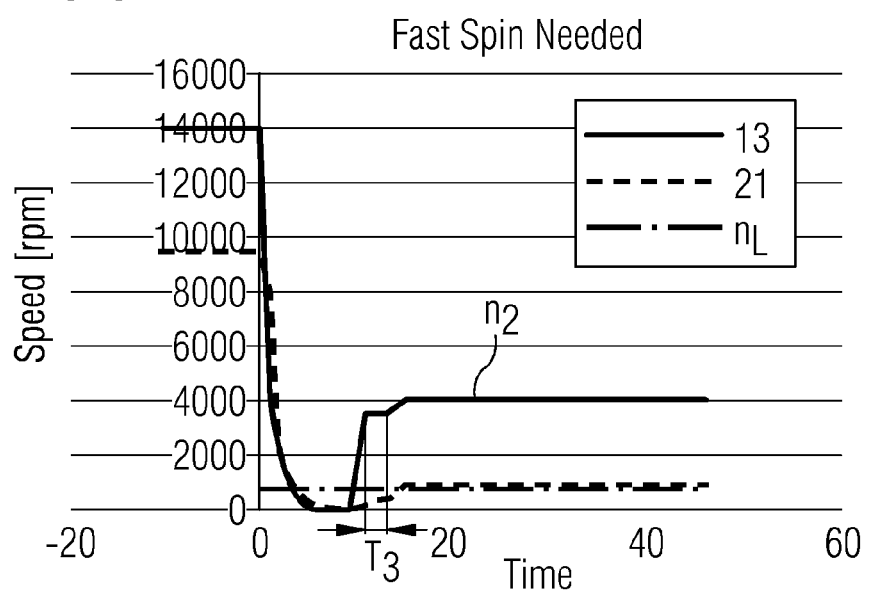
Figure 6:
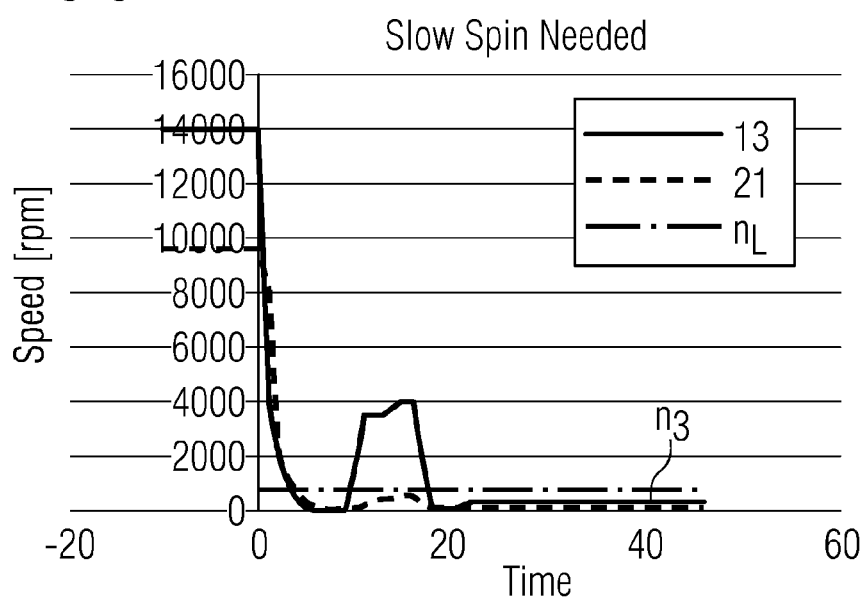
Figure 7:
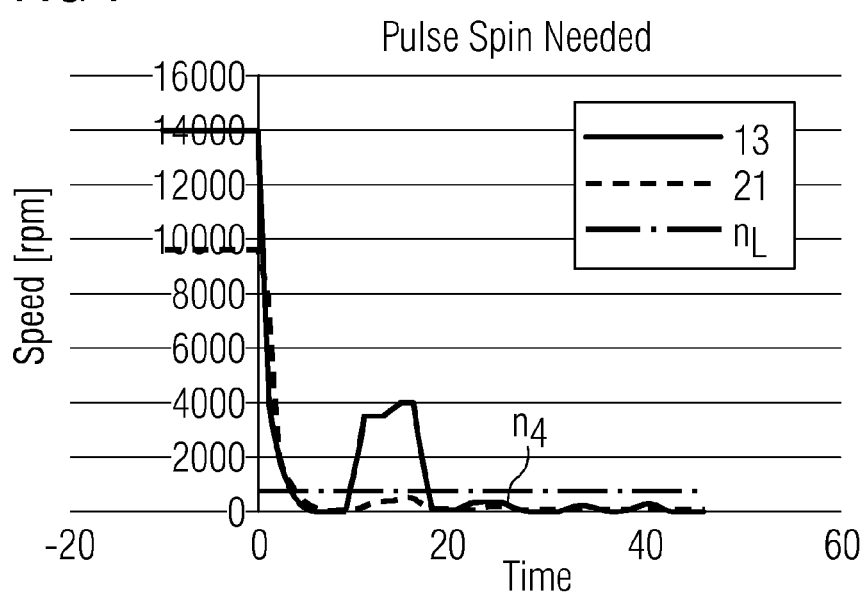

FIG. 3 schematically shows a dry gas seal 35, including a stationary ring 41 and a rotary ring 42. The stationary ring is pushed against the rotary ring by a spring 45. The rotary spring 42 is made of a hard material, like for example tungsten carbide or silicon carbide, and it is provided, on a surface 42a facing the stationary ring 41, with a plurality of groves 43. Each groove 43 has a logarithmic spiral shape or other convenient shape, for example any bi-directional design shape, in order that, when the rotary ring 42 is rotating with respect to the stationary ring 41, grooves are able to generate a fluid-dynamic force causing the stationary ring to separate and create a gas cushion between the two rings 41, 42, thus preventing wear.

FIG. 1a shows a block diagram of a method 100, according to the present invention, for managing the gas turbine assembly 10 during start up. The method 100 comprises monitoring the speed of the output shaft 21, by means of the sensor 40. The controller 50 receives from the sensor 40 the value of the speed of the output shaft 21 and operates the electrical motor 17 for the execution of method 100.

Method 100 comprises a sequence of steps 110 to 130 which are executed in parallel with the step of monitoring the speed of the output shaft 21.

Method 100 comprises a first step 110 during which the electrical motor 17 starts spinning the input shaft 13. In a second step 140 of method 100, the speed of the output shaft 21 is continuously monitored, in order to verify the following relation:

$$0 < n_{OUT} < n_L \quad (A)$$

where $n_{OUT}$ is the speed of the output shaft 21 and $n_L$ is the predefined slow roll speed limit.

The value of $n_L$ depends on each installation, being typically below 400 rpm for a 5-15MW gas turbine assembly. According to other exemplary embodiments of the present invention, the predefined slow roll speed limit is between 200 and 600 rpm.

If relation A is satisfied the method 100 repeats iteratively the second step 140, until a predefined condition is met, e.g. the speed of the output shaft 21 has reached a final predefined value, and method 100 is ended.

If relation A is not satisfied after a first predefined acceptable time T1, method 100 comprises a third step 120 of increasing the speed of the input shaft 13, in order to increase also the speed of the output shaft 21.

The first predefined acceptable time T1 is typically between 10 s and 30 s.

More advantageously, according to possible embodiments of the present invention, the first predefined acceptable time T1 is between 10 s and 20 s.

In a following fourth step 150 of method 100, the speed of the output shaft 21 is continuously monitored, in order to verify the following relation:

$$n_{OUT} > n_L \quad (B)$$

If relation B is satisfied the method 100 repeats iteratively the fourth step 150, until a predefined condition is met, e.g. start-up has completed, and method 100 is ended.

If relation B is not satisfied, method 100 comprises a fifth step 130 of waiting for a second predefined acceptable time T2 before further increasing the speed of the input shaft 13.

The second predefined acceptable time T2 is typically between 120 s and 300 s and is coincident with the purge time, i.e. with a time that, at a speed of the output shaft 21 below $n_L$, is sufficient to displace 3 to 5 times the inner overall volume of the gas turbine assembly 10.

More advantageously, according to possible embodiments of the present invention, the second predefined acceptable time T2 is between 60 s and 300 s.

At the end of the fifth step 130 the method 100 is completed.

FIG. 1b shows a block diagram of a method 200, according to the present invention, for managing the gas turbine assembly 10 during shut down.

FIGS. 4 to 7 show graphic plots of the speed of the input shaft 13 (continuous line) and of the output shaft 21 (dashed line) with reference to the predefined slow roll speed limit $n_L$ (dot-dashed line).

Method 200 comprises monitoring the speed of the output shaft 21, by means of the sensor 40. The controller 50 receives from the sensor 40 the value of the speed of the output shaft 21 and operates the electrical motor 17 for the execution of method 200.

Method 200 comprises a sequence of steps 205 to 295, which are executed in parallel with the step of monitoring the speed of the output shaft 21.

Method 200 comprises a first step 205 of waiting until the output shaft 21 has come to a complete stop after normal operation. Subsequently, method 200 comprises a second step 210 of waiting for a predefined wait time Tw. According to exemplary embodiments of the present invention, the predefined wait time Tw is 2 to 3 min, the exact value depending from the size and characteristics of the gas turbine 5 and gas compressor 30.

Subsequently, method 200 comprises a third step 215 of spinning the input shaft 13 at a first normal predefined speed n1. The first predefined speed is typically in the range of 1000 to 3000 rpm. More particularly, according to another embodiment of the present invention, first predefined speed is typically in the range of 1000 to 2000 rpm, i.e. 10 to 20 percent of the nominal power turbine speed.

In a fourth step 206 of method 200, the speed of the output shaft 21 is continuously monitored, in order to verify relation A. If relation A is satisfied (FIG. 4) the method 200 repeats iteratively the fourth step 206, until a predefined condition is met and method 200 is ended. For example, a predefined condition to be met could be the expiry of a convenient time which assures that temperatures in the gas turbine assembly 10 have come below dangerous values for components distortion.

If relation A is not satisfied for a third predefined acceptable time T3, method 200 comprises a fifth step 218 of increasing the speed of the input shaft up to a second predefined speed n2 greater than the first predefined speed n1. The third predefined acceptable time T3 is typically between 10 s and 20 s and the second predefined speed n2 is typically in the range of 2000 to 4000 rpm, 20 to 40 percent of the nominal power turbine speed.

More advantageously, according to possible embodiments of the present invention, the third predefined acceptable time T3 is between 10 s and 20 s.

In a sixth step 207 of method 200, the speed of the output shaft 21 is continuously monitored, in order to verify relation B.

If relation B is satisfied (FIG. 5) the method 200 repeats iteratively the sixth step 207, until a predefined condition is met (e.g. a convenient time, which assures that temperatures in the gas turbine assembly 10 have come below dangerous values, has expired) and method 100 is ended.

If relation B is not satisfied, method 200 continues with a seventh step 220 of stopping the input shaft 13 and with a subsequent eighth step 230 of checking that the output shaft 21 has come to a complete stop.

Subsequently, method 200 comprises a ninth step 240 of waiting for a time equal to the wait time Tw and a tenth step 250 of spinning the input shaft 13 at a third predefined speed n3 lower than the first predefined speed n1.

The third predefined speed n3 is in the range of 500 to 1000 rpm (i.e. 5 to 10 percent of the nominal power turbine speed), being this the lowest allowable spin speed for the gas turbine 12. The third predefined speed n3 should allow the input shaft 13 to spin, in order to prevent temperature distortions, while the output shaft 21 should remain still, in order to avoid wear of the dry gas seal 35.

In a following eleventh step 260 of method 200, the speed of the output shaft 21 is continuously monitored, in order to verify the relation A.

If relation A is not satisfied (FIG. 6), i.e. the output shaft 21 remains still, the method 200 repeats iteratively the eleventh step 260, until a predefined condition is met (e.g. a convenient time, which assures that temperatures in the gas turbine assembly 10 have come below dangerous values without any component distortion, has expired) and method 200 is ended.

If relation A is satisfied, meaning that the output shaft 21 is spinning at a speed lower than slow roll speed limit $n_L$, method 200 continues with a twelfth step 270 of stopping the input shaft 13 and with a subsequent thirteenth step 280 of checking that the output shaft 21 has come to a complete stop.

Subsequently, method 200 comprises a fourteenth step 282 of waiting for a time equal to the wait time Tw and a fifteenth step 285 of periodically spinning the input shaft 13 up to a fourth predefined speed n4 lower than the third predefined speed n3. The fourth predefined speed is typically 50 to 100 rpm, i.e. less than 1 percent of the nominal power turbine speed.

Each burst of the input shaft 13 at speed n4 is followed by a stop for an interval time Ts, which is comprised between 2 and 3 min.

The fifteenth step 285 should ensure that distortions due to temperature are minimised by changing the angle of the input shaft 13 relative to the temperature gradient, while the output shaft 21 remains still, thus avoiding wear of the dry gas seal 35.

In a following sixteenth step 290 of method 200, the speed of the output shaft 21 is continuously monitored, in order to verify the following relation:

$$n_{OUT}=0 \tag{C}$$

If relation C is satisfied (FIG. 6) the method 200 repeats iteratively the sixteenth step 290, until a predefined condition is met (e.g. a convenient time, which assures that temperatures in the gas turbine assembly 10 have come below dangerous values without any component distortion, has expired) and method 200 is ended.

If relation C is not satisfied, meaning that the output shaft 21 is spinning at a speed lower than slow roll speed limit $n_L$, method 200 continues with seventeenth step 292 of stopping the input shaft 13 and a final eighteenth step 295 of preventing the gas turbine assembly 10 to be restarted during a resting time Tr, which is comprised between 10 min and 4 hours, i.e. if not restarted within a short pre-defined interval (typically 10 to 15 minutes), the gas turbine assembly 10 is prevented from restarting for an extended longer period, typically of the order of 4 hours.

At the end of the eighteenth step 295 the method 200 is completed.

The invention claimed is:

1. A method for managing a gas turbine assembly during start up or shut down, the gas turbine assembly including a twin shaft gas turbine comprising an input shaft and an output shaft and a speed sensor for measuring a speed of the output shaft, the gas turbine assembly further comprising a rotor mounted on said output shaft and provided with at least a dry gas seal for preventing leakage of a gas between the rotor and the dry gas seal, the method comprising:

monitoring the speed of the output shaft, and in parallel reducing or increasing the speed of the input shaft after the monitored speed of the output shaft has remained above zero and below a predefined slow roll speed limit for a predefined acceptable time.

2. The method according to claim 1,
wherein the step of reducing or increasing the speed of the input shaft further comprises in sequence:
starting spinning the input shaft,
if after a first predefined acceptable time the speed of the output shaft remains below the predefined slow roll speed limit, then increasing the speed of the input shaft,
if the speed of the output shaft remains below the predefined slow roll speed limit, then waiting for a second predefined acceptable time before further increasing the speed of the input shaft.

3. The method according to claim 2,
wherein the first predefined acceptable time is 10 s to 30 s.

4. The method according to claim 2,
wherein the second predefined acceptable time is 60 s to 300 s.

5. The method according to claim 1,
wherein the step of reducing or increasing the speed of the input shaft further comprises in sequence:
waiting until the output shaft has stopped,
waiting for a predefined wait time,
spinning the input shaft at a first predefined speed,
if the speed of the output shaft remains for a third predefined acceptable time above zero but below the predefined slow roll speed limit, then increasing the speed of the input shaft up to a second predefined speed greater than the first predefined speed,
if the speed of the output shaft remains below the predefined slow roll speed limit, then stopping the input shaft, then
waiting for a time equal to the wait time, then
spinning the input shaft at a third predefined speed lower than the first predefined speed,
if the speed of the output shaft is greater than zero, then stopping the input shaft, then
waiting for a time equal to the wait time, then
periodically spinning the input shaft up to a fourth predefined speed lower than the third predefined speed and stopping the input shaft for an interval time,
if the speed of the output shaft is greater than zero, then stopping the input shaft, and
preventing the gas turbine assembly to be restarted during a resting time.

6. The method according to claim 5,
wherein the third predefined acceptable time is 10 s to 30 s.

7. The method according to claim 5,
wherein the first predefined speed is 10 to 20 percent of the nominal power turbine speed.

8. The method according to claim 5,
wherein the second predefined speed is 20 to 40 percent of the nominal power turbine speed.

9. The method according to claim 5,
wherein the third predefined speed is 5 to 10 percent of the nominal power turbine speed.

10. The method according to claim 5,
wherein the wait time is 2 to 3 min.

11. The method according to claim 5,
wherein the interval time is 2 to 3 min.

12. The method according to claim 5,
wherein the resting time is 10 min to 4 hours.

13. The method according to claim 1,
wherein the predefined slow roll speed limit is 200 to 600 rpm.

14. The method according to claim 1,
wherein the gas turbine assembly comprises a gas compressor including the rotor and the dry gas seal.

15. A gas turbine assembly, comprising
a twin shaft gas turbine comprising an input shaft and an output shaft,
a variable speed electrical motor connected to the input shaft,
a speed sensor for measuring a speed of the output shaft,
a controller which controls the variable speed electrical motor, and
a rotor mounted on said output shaft and provided with at least a dry gas seal for preventing leakage of a gas between the rotor and the dry gas seal,
wherein the speed sensor is configured to measure the speed of the output shaft, and
wherein the controller is configured to monitor the speed of the output shaft measured by sensor and to reduce or increase the speed of the input shaft via the variable speed electrical motor after the monitored speed of the output shaft has remained above zero and below a predefined slow roll speed limit for a predefined acceptable time.

16. The gas turbine assembly according to claim 15,
wherein, for reducing or increasing the speed of the input shaft, the controller is further configured to, in sequence:
start spinning the input shaft,
if after a first predefined acceptable time the speed of the output shaft remains below the predefined slow roll speed limit, then increase the speed of the input shaft,
if the speed of the output shaft remains below the predefined slow roll speed limit, then wait for a second predefined acceptable time before further increasing the speed of the input shaft.

17. The gas turbine assembly according to claim 16,
wherein the first predefined acceptable time is 10 s to 30 s, and/or
wherein the second predefined acceptable time is 60 s to 300 s.

18. The gas turbine assembly according to claim 15,
wherein, for reducing or increasing the speed of the input shaft, the controller is further configured to, in sequence:
wait until the output shaft has stopped,
wait for a predefined wait time,
spin the input shaft at a first predefined speed,
if the speed of the output shaft remains for a third predefined acceptable time above zero but below the predefined slow roll speed limit, then increase the speed of the input shaft up to a second predefined speed greater than the first predefined speed,
if the speed of the output shaft remains below the predefined slow roll speed limit, then stop the input shaft, then
wait for a time equal to the wait time, then
spin the input shaft at a third predefined speed lower than the first predefined speed, if the speed of the output shaft is greater than zero, then stop the input shaft, then wait for a time equal to the wait time, then periodically spin the input shaft up to a fourth predefined speed lower than the third predefined speed and stop the input shaft for an interval time, if the speed of the output shaft is greater than zero, then stop the input shaft, and prevent the gas turbine assembly being restarted during a resting time.

19. The gas turbine assembly according to claim 18, wherein the third predefined acceptable time is 10 s to 30 s, and/or wherein the first predefined speed is 10 to 20 percent of the nominal power turbine speed, and/or wherein the second predefined speed is 20 to 40 percent of the nominal power turbine speed, and/or wherein the third predefined speed is 5 to 10 percent of the nominal power turbine speed, and/or wherein the wait time is 2 to 3 min, and/or wherein the interval time is 2 to 3 min, and/or wherein the resting time is 10 min to 4 hours.

20. The gas turbine assembly according to claim 15, wherein the predefined slow roll speed limit is 200 to 600 rpm.

* * * * *